United States Patent

Maher

[15] 3,684,828

[45] Aug. 15, 1972

[54] GRAPHIC COMMUNICATION SYSTEM

[72] Inventor: Robert A. Maher, 8906 Pointer Lane, Austin, Tex. 78758

[22] Filed: Nov. 2, 1970

[21] Appl. No.: 85,942

[52] U.S. Cl. ....................178/18

[51] Int. Cl. ....................G08c 21/00

[58] Field of Search ....................178/18, 19, 20; 340/16

[56] References Cited

UNITED STATES PATENTS

| | | | |
|---|---|---|---|
| 3,134,099 | 5/1964 | Woo | 178/18 |
| 3,504,334 | 3/1970 | Turnage, Jr. | 340/1 C |
| 3,156,766 | 11/1964 | Stamps | 178/18 |
| 3,439,317 | 4/1969 | Miller | 178/18 |

*Primary Examiner*—Kathleen H. Claffy
*Assistant Examiner*—Horst F. Brauner
*Attorney*—Harold Levine, James O. Dixon, Andrew M. Hassell, Melvin Sharp, Rene E. Grossman and James T. Comfort

[57] ABSTRACT

Disclosed is a man-to-computer real-time graphic communication system that includes a piezoelectric substrate having a major surface defining an X, Y coordinate system. A pair of interdigitated surface wave transducers orthogonally disposed on the substrate surface transform periodic clock pulses from a pulse generator into two discrete surface wave pulses, one surface wave pulse propagating in the X coordinate direction of the substrate surface and the other propagating in the Y coordinate direction. A probe having an electric field detector tip is positioned at a location on the surface of the substrate and the time required for the periodic X and Y surface wave pulses to propagate to the probe is measured by a suitable counter. The elapsed time provides an analog of the X and Y coordinate location of the probe on the substrate surface. The X and Y coordinate location may be transferred directly to a computer for processing. If desired, the probe location may be displayed on a cathode ray tube to facilitate positioning of the probe by the user.

10 Claims, 7 Drawing Figures

INVENTOR
Robert A. Maher
BY Jim Comfort
ATTORNEY

Richard L Donaldson
WITNESS

GRAPHIC COMMUNICATION SYSTEM

This invention pertains generally to signal processing and more particularly to a real-time acoustic surface wave man-to-computer graphic communication system and method for operating same.

Man-to-computer graphical communication systems convert freehand graphical information on a real-time basis into digital form which can then be stored in a computer. Generally the stored information is displayed on a cathode ray tube projection system enabling the user to see what graphic information has been entered. One such system has been disclosed in Davis et al, "The Rand Tablet: A Man-Machine Graphical Communications Device," *Instruments and Control Systems*, December, 1965, page 101. This system includes a tablet "writing" surface and a stylus for entering graphical information. The tablet is a printed circuit screen complete with printed circuit capacitive-coupled encoders. The 10 × 10 inch tablet requires 40 external connections and comprises more than $10^6$ discrete locations. The tablet device generates 10-bit "X" and 10-bit "Y" stylus position information. The stylus is connected to an input channel of a general purpose computer and also to an oscilloscope display. The control multiplexes the stylus position information with computer generated information in such a way that the oscilloscope display contains a composite of the current pen position which is represented as a dot and the computer output. In addition, the computer may be programmed to regenerate the track history on the CRT, so that while the user is writing, it appears that the pen has ink.

The 10 inch writing pad or tablet is comprised of a copper grid etched on a Mylar subsurface, the grid defining more than $10^6$ intersecting points. Coded signals are periodically applied on each point by a train of 20 bits every 220 microseconds. A stylus positioned on the "writing" surface of the tablet capacitively picks up these bits and inputs this information into a computer using 10 bits for the X location and 10 bits for the Y location. Every point on the grid may thus be defined by a unique coding of pulses.

Utilizing such a system as described above, a user may draw a curve on the tablet and quickly get the area, the mathematical formula, the length, etc., associated with the curve. Also, the computer may be programmed to straighten out curved lines or adjust the curve to fit a formula or execute any programmable task in essentially real time.

Various problems are associated with the graphical communication system as above described. Precise fabrication techniques are required in order to fabricate the writing tablet to have sufficient resolution. As would be expected, such fabrication techniques are expensive and time consuming. The relatively high degree of complexity of the system adds to the expense and requires sophisticated maintenance techniques. Further, the accuracy of conventional graphical communication systems varies with temperature variations.

Accordingly it is an object of the present invention to produce a more economical real-time man-to-computer graphical communication system.

A further object of the invention is to produce a man-to-computer communication system utilizing acoustic surface wave technology.

Another object of the invention is to produce a graphical communication system, the accuracy of which independent of temperature variations.

Briefly and in accordance with the present invention, a writing surface for a real-time man-to-computer graphical communication system comprises a piezoelectric substrate. A pair of interdigitated surface wave transducers are disposed on a surface of the piezoelectric substrate substantially perpendicular to one another and respectively aligned with the X and Y coordinate axis of the substrate. Periodic clock pulses are applied respectively to the orthogonally disposed transducers which transform the clock pulses into surface wave pulses which propagate along the surface of the piezoelectric substrate. A probe or stylus having an electric field detector in one tip thereof is positioned into contact with the surface of the substrate and detects the propagating surface wave pulses. The time required for the respective surface wave pulses to propagate from the transducer to the probe is measured to provide an analog of the X and Y coordinate position of the probe on the surface of the piezoelectric substrate. This analog signal may be directly applied to a general purpose computer. In a preferred embodiment the X and Y surface wave transducers each have electrodes with graded periodicity thus enabling X and Y linear F.M. (frequency modulated) pulses to be applied simultaneously to the transducers without inducing position ambiguities in the system. Temperature compensation may be provided by forming the delay elements of the oscillator utilized in the clock pulse generator on the same substrate utilized for the writing surface.

The novel features believed to be characteristic of this invention are set forth in the appended claims. The invention itself, however, as well as other objects and advantages thereof may best be understood by reference to the following detailed description of illustrative embodiments when read in conjunction with the accompanying drawings in which:

Figures 1, 2, 3:
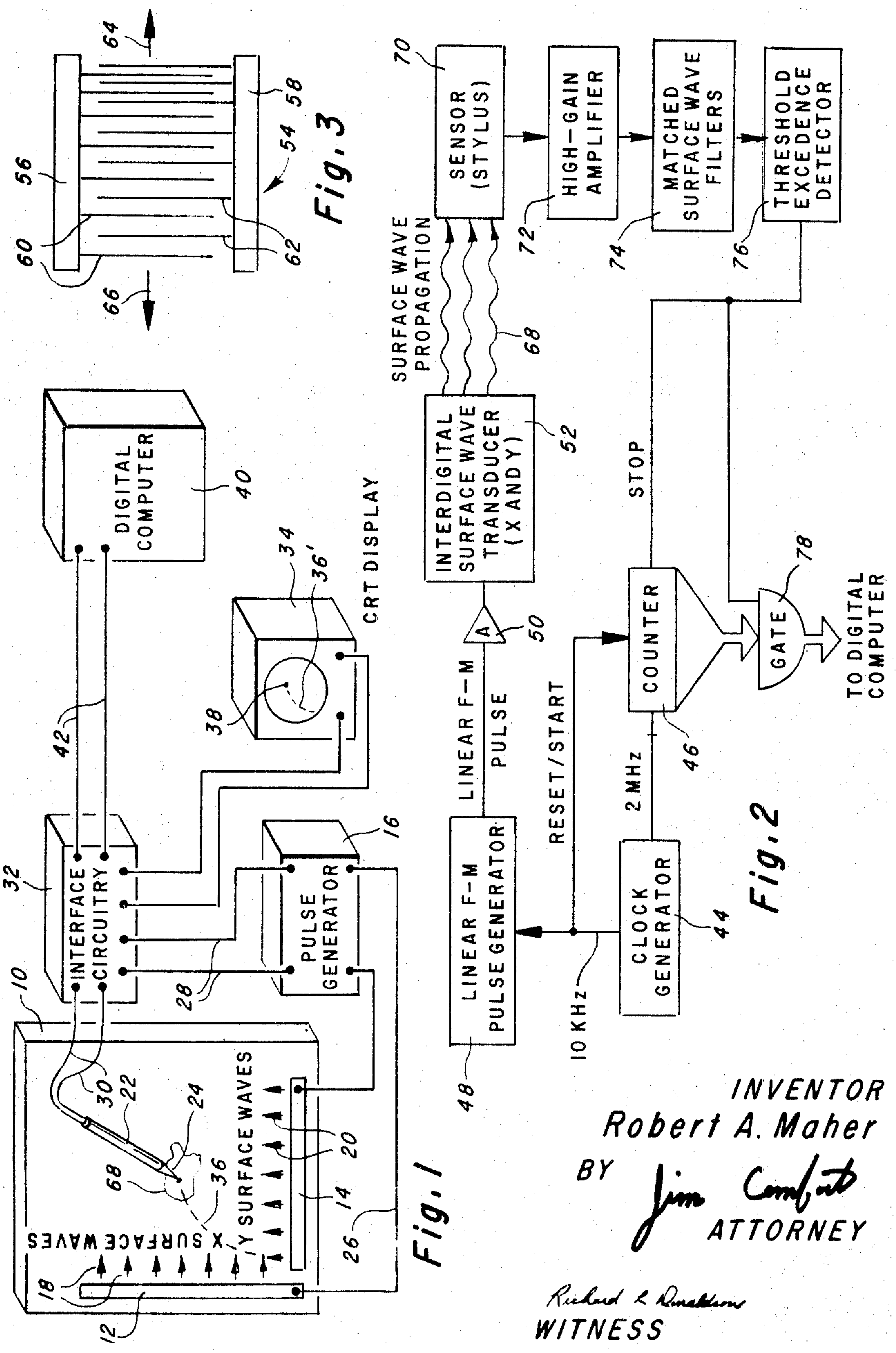
FIG. 1 is a pictorial view illustrating an embodiment of a man-to-computer graphical communication system of the present invention.
FIG. 2 depicts in block diagram form an illustrative embodiment of a real-time man-to-computer graphical communication system.
FIG. 3 depicts an interdigitated surface wave transducer having electrodes with graded periodicity.

With reference now to the drawings, FIG. 1 pictorially depicts an illustrative embodiment of a man-to-computer graphical communication system of the present invention. The "writing" surface, that is, the surface upon which graphical data is entered into the computer, is indicated at 10. The surface 10 comprises a layer of piezoelectric material such as quartz, ceramics, etc. Although any piezoelectric material may be used for the writing surface, ceramics are preferably used since relatively large samples of these materials are easily fabricated and since these materials are relatively inexpensive and easy to handle. The writing surface 10 may be any convenient size, such as, for example, 25 centimeters by 25 centimeters. A pair of surface wave transducers 12 and 14 are disposed on the surface 10 orthogonal to one another. Preferably the transducers 12 and 14 are formed adjacent the edges of the writing surface 10. In one embodiment, a pulse generator 16 periodically and sequentially applies pulses to each of the transducers 12 and 14. The pulse generator 16 may comprise, for example, a conventional oscillator. The transducers respectively transform these pulses into surface wave pulses, transducer 12 producing surface waves that propagate, for example, in the direction indicated by the arrows 18. This acoustic surface wave pulse provides an indication of the X coordinate position of any point on the writing surface 10. Similarly the transducer 14 produces an acoustic surface wave pulse in response to the pulses generated by the pulse generator 16. The pulse produced by transducer 14 propagates in the direction indicated by the arrows 20, thereby providing an indication of the Y coordinate position of a point on the writing surface 10. A probe 22 is positioned into contact with the surface 10. The probe has a detector in its tip 24 which detects the electric field generated by the propagating surface wave pulses. The probe 22 thus provides a signal indicative of the X and Y coordinate position of the location of the probe tip 24 on the surface 10. The detector, for example, may comprise a conventional loop antenna. Any of the various electric field detectors known in the art may be utilized however.

In operation the pulse generator 16 applies a pulse to the X transducer 12 by an electrical connection 26. The interdigitated surface wave transducer 12 produces an acoustic surface wave in the surface 10 that propagates in the direction indicated by the arrows 18. At the same instant that the pulse generator applies a pulse to interdigitated transducer 12, a pulse is also applied by lead 28 to interface circuitry 32 indexing a suitable digital counter therein. The acoustic surface wave generated by transducer 12 in response to the pulse from the pulse generator 16 propagates along the surface 10 with a velocity determined by the characteristics of the material used to fabricate the writing surface. For example, with material such as quartz or ceramics, the acoustic surface wave propagates with a velocity of approximately 3.3 mm per microsecond. Thus, if the tablet is in the range of 250 mm square, it will take approximately 75 microseconds for the acoustic surface wave pulse to propagate completely across the surface 10. The probe 22 is positioned on the surface 10 to detect the propagating acoustic wave as it travels underneath the detector in the probe tip 24. The signal generated thereby is applied by electrical lead 30 to the interface circuitry 32. The electrical pulse operates to stop the counter 46 initiated by generation of the pulse from the pulse generator 16. Thus, the reading of the counter 46 provides an analog of the coordinate position of the probe 22. Similarly, the pulse generator applies a pulse to the Y interdigitated surface wave transducer 14 which is disposed so as to cause a surface wave to propagate in the Y coordinate direction. This pulse, for example, may be applied 100 microseconds after application of the pulse to the X transducer 12. The probe 22 provides an indication of the time required for the surface wave generated by Y transducer 14 to propagate to the position of the probe. The cycle is then repeated to "update" the position of the probe.

A cathode ray tube (CRT) display 34 is also connected to the interface circuitry 32 and provides a real-time display of the position of the probe 22 and of the path traced by the probe. For example, the dashed line 36 on the surface 10 indicates a curve that has been drawn with the scribe or probe 22 by the user. This path is shown on the CRT 34 as line 36'. The dot 38 indicates the current position of the probe 22 on the surface 10. In this manner the user can visually observe the graphic information he has entered into the computer. Similarly, the CRT display can provide a graphic illustration on a real-time basis of the output of the digital computer 40. The interface circuitry 32 is also electrically connected by leads 42 to a digital computer 40. The leads 42 transfer coordinate information of the probe 22 to the digital computer to be processed. As mentioned earlier, once the data is processed it may be displayed upon the CRT display 34.

With reference to FIG. 2 there is depicted in block diagram a preferred embodiment of the present invention wherein the X and Y surface wave transducers may be pulsed simultaneously. A conventional clock pulse generator is indicated at 44. The clock generator 44 provides clock pulses to a counter 46. Digital counters are well known in the art and need not be explained in more detail herein. The clock generator 44 provides clock pulses to a counter 46 at the rate of, for example, 2 MHz. The clock generator 44 also produces trigger pulses at a rate of, for example, 10 KHz. These trigger pulses perform two functions; first, they operate to reset or start the counter 46. As will be explained in more detail hereinafter, the counter 46 operates to measure the elapsed time required for the subsequently generated acoustic surface wave pulses to propagate to the location of the probe. Secondly, the trigger pulses are applied to a pulse generator 48 which is operative to produce pulses having a duration in the range of 10–50 nanoseconds. Preferably the pulse generator produces a linear F.M. pulse sweeping in frequency from, for example, 100 MHz to 150 MHz. Although it is preferred that the pulse generator 48 produce a linearly coded F.M. pulse, other means of coding the pulse known to those skilled in the art may be utilized. As will be explained in more detail hereinafter, it is necessary to code the pulse in some manner in order to simultaneously pulse the X and Y interdigitated surface wave transducers to enable subsequent detection of the respective signals.

The F.M. pulses are amplified by amplifier 50 and are applied simultaneously to orthogonally disposed interdigitated surface wave transducers shown in block diagram at 52. As shown in FIG. 1, preferably these transducers are positioned adjacent respective edges of the writing surface 10. Although the transducers 12 and 14 of FIG. 1 are shown as being single transducers, preferably each of the transducers 12 and 14 is comprised of a plurality of individual surface wave transducers which are simultaneously pulsed. A representative interdigitated surface wave transducer making up a part of the X transducer 12 is shown in FIG. 3.

Referring now to FIG. 3, an interdigitated surface wave transducer is indicated generally at 54. The transducer 54 is comprised of two electrical pads 56 and 58. One set of electrodes 60 are commonly connected to pad 56 while a second set of electrodes 62 are commonly connected to the pad 58. The two sets of electrodes 60 and 62 are interleaved in an interdigitated manner. Further, the electrodes 60 and 62 are formed to have a graded periodicity; that is, the space between adjacent electrodes 60 and 62 varies along the length of the transducer 54. For maximum efficiency of coupling, the periodicity of the electrodes 60 and 62 exactly corresponds with the frequency variations of the F.M. pulse produced by the pulse generator 48 in FIG. 2. As understood by those skilled in the art, an interdigitated surface wave transducer such as shown in FIG. 3 will, in response to a signal applied across terminals 56 and 58, generate in a piezoelectric substrate an acoustic surface wave that propagates in the directions shown by the arrows 64 and 66. The surface wave pulse generated by the transducer 54 will correspond to the periodicity of the electrodes 60 and 62. In other words, the segment of the surface wave pulse traveling in the direction indicated by the arrow 64 will have a leading edge having very high frequency components corresponding to the close spacing of adjacent electrodes 60, 62 at the righthand side of FIG. 3 and a trailing edge having relatively low frequency components corresponding to the relatively wide spacing of adjacent electrodes 60 and 62 at the lefthand side of the transducer in FIG. 3.

Figures 3A, 4:
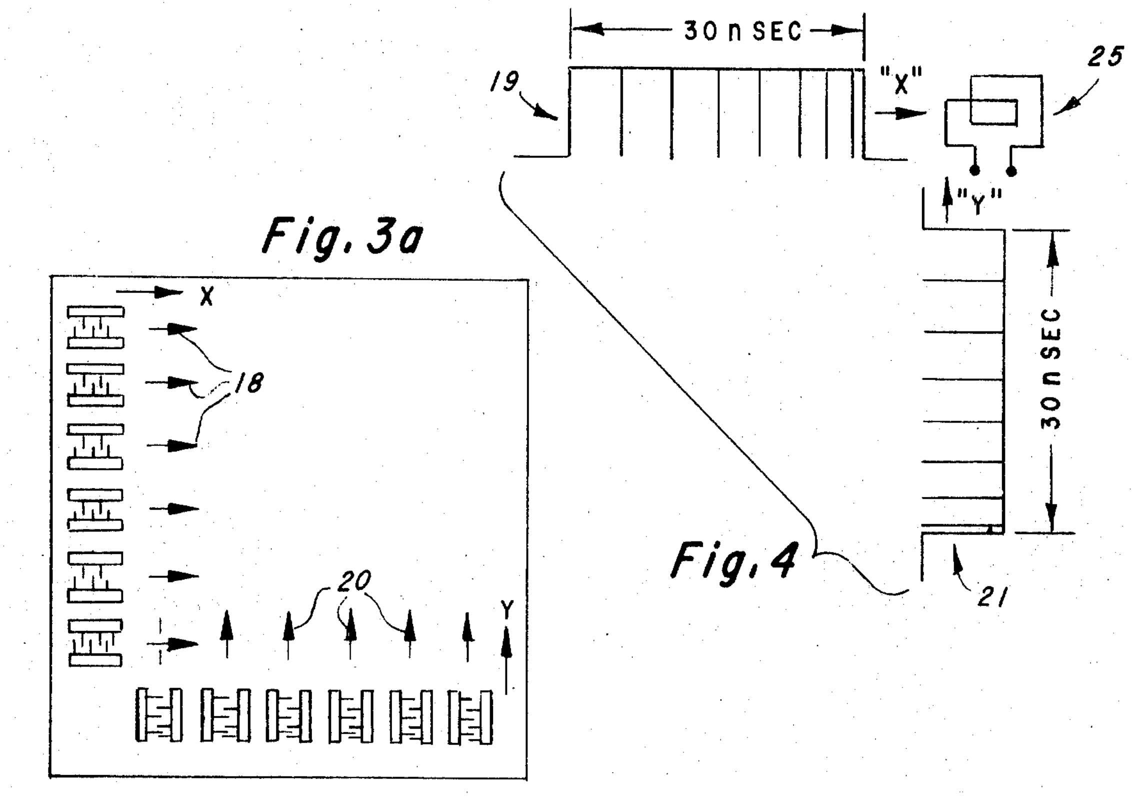
FIG. 4 is a greatly enlarged view schematically illustrating a probe tip that may be utilized with the present invention.

In accordance with a preferred embodiment of the present invention, and as depicted in FIG. 3*a*, the X and Y transducers and are respectively comprised of a plurality of identical interdigitated surface wave transducers each having electrodes with a graded periodicity. As understood by those skilled in the art, in accordance with Huygen's principle, when a large number of individual transducers are simultaneously pulsed, a plane (linear) wavefront is produced a short distance from the transducers. The X transducers are disposed such that the leading edge of the surface wave pulse generated thereby and propagating in the direction indicated by the arrows 18 contain relatively high frequency components. The Y transducers, on the other hand, are disposed such that the leading edge of the pulses propagating in the direction indicated by the arrows 20 contain relatively low frequency components.

In FIG. 4 there is illustrated diagrammatically a greatly enlarged view of the area 68 of FIG. 1 where the probe tip 24 is in contact with the writing surface 10. In FIG. 4 the probe tip 24 is shown as comprising a conventional loop antenna 25. As understood by those skilled in the art, a loop antenna is not directional and therefore is operative to detect surface waves propagating in both the X and Y directions on the surface 10. In some applications, however, it may be desired to utilize separate specially designed detectors to optimize detection of the surface waves. The probe 22 is illustrated in FIG. 4 in a position such that the antenna 25 simultaneously detects the X and Y surface waves 19 and 21. The X component acoustic surface wave is shown diagrammatically at 19 to have a width of about 30 nanoseconds. As may be seen, the leading edge of the X component acoustic surface wave 19 contains relatively high frequency components of the F.M. pulse. Contrarywise, the leading edge of the Y coordinate surface wave pulse 21 comprises relatively low frequency components of the F.M. pulse. At this juncture, it should be noted that the width of the pulses 19 and 21 exactly corresponds to the width of the transducer 54 such as is shown in FIG. 3. As the surface waves 19 and 21 propagate underneath the probe tip 24, electrical field disturbances generated thereby will be detected by the probe tip 24 and an electrical signal will be generated. It will be appreciated, of course, that without further processing it is impossible to determine which surface wave, that is, the one traveling in the X coordinate direction or the one traveling in the Y coordinate direction, or both, produces the signal in the probe tip 24. As will be explained hereinafter, subsequent processing is required to identify the respective signals.

With reference again to FIG. 2, the acoustic surface waves generated by the X and Y coordinate transducers 12 and 14 of FIG. 1 are shown diagrammatically by the arrows 68. These propagating acoustic surface waves are detected by a sensor or probe shown in block diagram form at 70. The signal generated by the detector is amplified by a conventional high gain amplifier 72 and are applied to matched surface wave filters 74. The matched surface wave filters are operative to separate the X and Y coordinate position portions of the signal. Upon receiving a signal indicative of the X coordinate generated surface wave, the matched filters 74 apply the signal to a threshold exceedance detector 76 which applies a stop signal to the counter 46 and also applies a signal to the gate 78. The reading of the counter 46 thus provides an analog of the X coordinate position of the probe. Similarly when the Y coordinate position surface wave is identified by the matched filters 74, threshold excedance detector 76 applies a stop signal to the counter 46 and a signal to the gate 78. The gate 78 transfers a digital X,Y coordinate position of the probe to a digital computer for subsequent processing.

Figure 5:
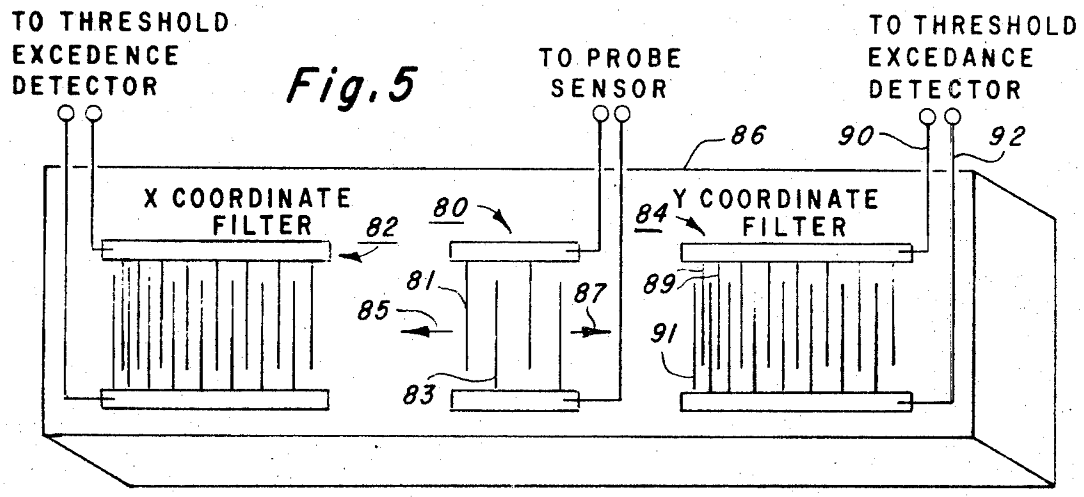
FIG. 5 depicts matched interdigitated surface wave transducers that may be utilized when the X and Y transducers are simultaneously pulsed.

The matched surface wave filters 74 may, for example, be comprised of filters such as are shown in FIG. 5. With reference to FIG. 5, a bi-directional broadband input interdigitated surface wave transducer is shown generally at 80. An X coordinate matched filter is shown at 82 and a Y coordinate matched filter is shown at 84. The surface wave filters 80, 82 and 84 are mounted on the surface of a piezoelectric substrate 86. The substrate 86 may comprise any conventional piezoelectric material known to those skilled in the art such as quartz, lithium niobate, ceramics, etc. The output from the probe sensor is applied to the input transducer 80. The output from the probe sensor comprises a frequency modulated pulse such as generated by the input transducers 12 and 14 of FIG. 1. Considering the situation where the probe 22 is positioned exactly in the center of the writing surface 10, (reference FIG. 1 for purposes of illustration), it will be appreciated that the surface wave propagating in the X coordinate direction and the surface wave propagating in the Y coordinate direction will be detected by the probe 22 simultaneously (for the situation where the transducers 12 and 14 are simultaneously pulsed). With the transducers 12 and 14 disposed such that the transducer 12 produces surface wave pulses having a leading edge with relatively high frequency components and such that the leading edge of the surface wave propagating in the Y direction has a relatively low frequency component, the electrical signal generated at the output of the probe sensor will be garbled. That is, it will be a composite of the surface wave pulses 19 and 21 (reference FIG. 4).

As mentioned previously the input transducer 80 is a broadband bi-directional interdigitated transducer. The spacing between adjacent electrodes 81 and 83 is preferably chosen to be one-half the wavelength of the center frequency of the modulated pulse generated by the pulse generator 48 in FIG. 2. The signal from the probe sensor will generate an acoustic surface wave in the substrate 86 that will propagate in the directions shown by the arrows 85 and 87. For purposes of illustration the surface wave propagating in the direction 87 will be described. As explained earlier, this surface wave is a composite of the two acoustic surface waves 19 and 21 of FIG. 4. Considering the X propagating acoustic surface wave 19, the leading edge portions of this surface wave pulse have relatively high frequency components. These high frequency components are detected by the probe tip 24 and converted to electrical signals and are then reconverted into surface waves by the input transducer 80 of FIG. 5. These surface waves propagate along the piezoelectric substrate 86 and subsequently pass under the Y coordinate matched filter 84. As the term "matched filter" implies, the periodicity of the filter 84 exactly corresponds to the frequency variations of the original frequency modulated pulse generated by the pulse generator 48 of FIG. 2. Thus, the lefthand portion of the Y coordinate matched filter 84 comprises relatively closely spaced adjacent electrodes 89, 91 which precisely correspond to the high frequency components of the linear F.M. pulse. Thus, as soon as the leading edge portions of the pulse 19 underlie the matched filter 84, a small signal is generated across the leads 90, 92 of the matched filter 84. As the leading edge portion continues to propagate under the matched filter 84, only a very limited number of the adjacent electrodes, such as 89 and 91 of the filter 84, are precisely matched with the pulse 19. Thus, only a low level output signal is generated as the pulse 19 propagates underneath the matched filter 84. The low level signal is insufficient to trigger the threshold exceedance detector 76.

Figure 6:
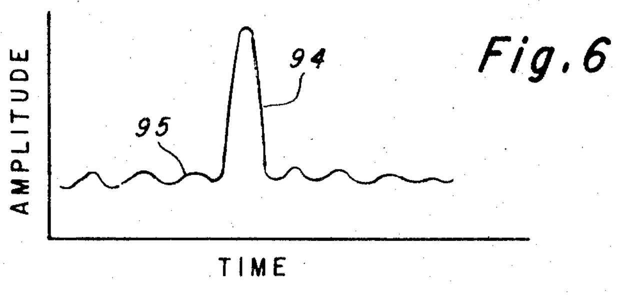
FIG. 6 graphically depicts the output of one of the matched filters illustrated in FIG. 5.

Consider now, for example, the pulse 21 that propagates in the Y coordinate direction. As will be noticed, the leading edge components of this pulse are relatively low frequency components. These components are detected by the detector 24, transformed into electrical signals and retransformed into surface waves by the input transducer 80 and thereafter propagate along the surface of the substrate 86. As the leading edge components propagate to a point underlying the lefthand side of the Y coordinate filter 84, only a very low signal output will be produced since the periodicity of the adjacent electrodes 89, 91 at the lefthand side of the Y coordinate matched filter 84 does not correspond with the frequency components of the leading edge of the pulse 21. As the pulse 21 continues to propagate underneath the matched filter 84, only a low level signal will be produced across the output 90, 92. At the instant, however, that the pulse 21 precisely underlies the matched filter 84, it will be seen that the leading edge components of the pulse 21 which are relatively low frequency components are precisely aligned with adjacent electrodes 89 and 91 at the righthand side of the Y coordinate matched filter 84 wherein the spacing between adjacent electrodes is precisely matched to those low frequency components. Similarly, the trailing edge components of the pulse 21 are high frequency components and they are precisely aligned with the lefthand portion of the matched filter 84. Similarly all of the intermediate adjacent electrodes are precisely aligned with corresponding frequencies of the F.M. pulse. Thus a very large pulse is generated across the output 90, 92. Such a pulse is shown in FIG. 6 at 94, the relatively low level sidelobes and noise being indicated at 95. The pulse 94 is sufficient to trigger "on" the threshold excedance detector and provide a stop signal to the counter 46 and a signal to the gate 78 of FIG. 2.

Similarly the X coordinate matched filter 82 functions to produce a large output signal only when the surface wave propagating in the X coordinate direction of FIG. 1 exactly underlies the matched filter 82.

The interdigitated surface wave transducer 80 utilized with the present invention may be fabricated in accordance with conventional metallization techniques. For example, the metal electrodes and the conductive terminals may be fabricated by depositing aluminum on a piezoelectric substrate using a photolithographic mask to expose an appropriate photoresist and then etching the substrate to remove the undesired aluminum. Other metals such as gold could be utilized. Metal electrodes of the interdigitated transducers are preferably deposited to a thickness of between 1,000–3,000 A.

It will be appreciated by those skilled in the art that the accuracy of the X,Y coordinate positions determined in accordance with the present invention is dependent upon the relationship between the phase velocity of the surface wave pulses propagating on the surface of the piezoelectric substrate and the oscillator frequency of the clock pulse generator. The phase velocity of the surface waves, however, varies as a function of substrate temperature. Thus, if a temperature independent system is desired, means are required for compensating for temperature variations of the substrate. In accordance with one embodiment of the present invention, temperature compensation may be provided by making the oscillator frequency proportional to the phase velocity. This may be effected by constructing the oscillator such that its frequency is determined by a set of delay elements formed on the same substrate as the writing surface. Oscillator circuits suitable for use with the present invention are known in the art and therefore are not explained in more detail herein.

Although specific embodiments of the present invention have been described herein, it will be apparent to a person skilled in the art that various modifications to the details of construction shown and described may be made without departing from the scope of the invention. For example, it may be preferred to use unidirectional transducers in lieu of bidirectional transducers in order to reduce triple transit echoes and increase the efficiency of operation. Such unidirectional transducers are known in the art. Further, it may be desired to coat the writing surface and the tip of the stylus with a wear-resistant coating to prolong the useful lifetime of the system. Additionally, the stylus could be fabricated to contain a compact, battery operated transmitter, obviating the necessity of providing electrical leads to the stylus permitting more freedom for the user. Also, the present invention could be utilized in conjunction with non-refreshed CRT displays. That is, conventional light pen sensors are not operable with non-refreshed storage CRT displays. In accordance with the present invention, however, a transparent piezoelectric substrate such as quartz could be positioned over a storage type CRT display thereby providing a real-time graphical communication system for use with such displays.

What is claimed is:

1. A graphical communication system comprising in combination:

a. a piezoelectric substrate having a major surface for receiving graphic information, discrete locations of said surface being defined by unique X and Y coordinates;

b. means for periodically generating clock pulses;

c. means for transforming said periodic pulses into at least two discrete surface wave pulses that propagate along said substrate surface in directions orthogonal to one another;

d. means for detecting the electric field produced by said surface waves as they propagate along said surface; and e. means for measuring the time elapsed between generation of said pulses and detection thereof, said elapsed time providing an analog of the X and Y coordinate position of said detection means upon said surface.

2. A graphical communication system as set forth in claim 1 wherein said means for transforming said clock pulses to orthogonally propagating surface wave pulses comprises a pair of interdigital surface wave transducers orthogonally disposed on said surface.

3. A graphical communication system as set forth in claim 1 wherein said clock pulses have predetermined characteristics.

4. The system as set forth in claim 3 wherein said clock pulses comprise linear frequency modulated pulses.

5. A graphical communication system as et set forth in Claim 3 further comprising interdigital surface wave filters in the detector means, said filters being matched to the predetermined characteristics of said clock pulses.

6. A graphical communication system as set forth in claim 1 wherein said substrate is a ceramic.

7. A graphical communication system as set forth in claim 2 wherein said X and Y transducers are respectively comprised of a plurality of discrete interdigital surface wave transducers.

8. A method of graphical communication comprising the steps of:

a. periodically generating sequential orthogonal surface wave pulses on the surface of a piezoelectric substrate;

b. positioning a stylus having an electric field detector point on said substrate surface such that said detector interacts with the electric field produced by propagation of said surface wave pulses thereby providing an electrical signal;

c. measuring the time required for each of said orthogonal surface wave pulses to propagate to the position of said stylus to provide an analog of the X, Y coordinate position of said stylus on said surface; and d. electrically connecting said analog signal to a computer for processing.

9. A method for graphical communication comprising the steps of:

a. simultaneously generating coded orthogonally disposed surface wave pulses on the surface of a piezoelectric substrate;

b. positioning a stylus having an electric field detector point on said substrate surface such that said detector interacts with the electric field produced by propagation of said surface wave pulses thereby providing an electrical signal;

c. filtering the signal produced by said stylus with interdigital surface wave filters respectively matched to said coded pulses thereby effectively separating the X and Y coordinate components of said signal;

d. measuring the time required for each of said orthogonal surface wave pulses to propagate to the position of said stylus to provide an analog of the X, Y coordinate position of said stylus on said surface; and e. electrically connecting said analog signal to a computer for processing.

10. A graphical communication method as set forth in claim 9 wherein said coded pulses comprise linear frequency modulated pulses.

* * * * *

UNITED STATES PATENT OFFICE
CERTIFICATE OF CORRECTION

Patent No. 3,684,828 Dated August 15, 1972

Inventor(s) Robert A. Maher

It is certified that error appears in the above-identified patent and that said Letters Patent are hereby corrected as shown below:

On the first page (Cover Sheet) left hand column after the listing of Inventors insert:

[73] Assignee: Texas Instruments Incorporated, Dallas, Texas.

Signed and sealed this 29th day of May 1973.

(SEAL)
Attest:

EDWARD M.FLETCHER,JR.
Attesting Officer

ROBERT GOTTSCHALK
Commissioner of Patents